(12) United States Patent
Hollander et al.

(10) Patent No.: US 11,169,291 B2
(45) Date of Patent: Nov. 9, 2021

(54) ACCELERATED SEISMIC INTERPOLATION OF MEASURED DATA COLLECTED BY A SET OF GEOPHONES ARRANGED IN AN IRREGULARLY SPACED GRID

(71) Applicant: EMERSON PARADIGM HOLDING LLC, Houston, TX (US)

(72) Inventors: Yaniv Hollander, Houston, TX (US); Orhan Yilmaz, Houston, TX (US)

(73) Assignee: EMERSON PARADIGM HOLDING LLC, Houston, TX (US)

( * ) Notice: Subject to any disclaimer, the term of this patent is extended or adjusted under 35 U.S.C. 154(b) by 268 days.

(21) Appl. No.: 16/282,077

(22) Filed: Feb. 21, 2019

(65) Prior Publication Data
US 2020/0271804 A1    Aug. 27, 2020

(51) Int. Cl.
*G01V 1/32*    (2006.01)
*G01V 1/38*    (2006.01)
*G01V 1/18*    (2006.01)

(52) U.S. Cl.
CPC ............ *G01V 1/32* (2013.01); *G01V 1/181* (2013.01); *G01V 1/38* (2013.01); *G01V 2210/46* (2013.01); *G01V 2210/57* (2013.01)

(58) Field of Classification Search
CPC ... G01V 1/32; G01V 1/28; G01V 1/38; G01V 1/181; G01V 2210/64; G01V 2210/57; G01V 2210/46
See application file for complete search history.

(56) References Cited

U.S. PATENT DOCUMENTS

| 2010/0212909 A1 | 8/2010 | Baumstein |
| 2012/0033525 A1 | 2/2012 | Abma |
| 2016/0187513 A1 | 6/2016 | Poole |

OTHER PUBLICATIONS

Gholami et al., Time-Invariant Radon Transform By Generalized Fourier Slice Theorem, 2017, Inverse Problems and Imaging, vol. 11, No. 3, pp. 501-519 (Year: 2017).*

(Continued)

*Primary Examiner* — Toan M Le
(74) *Attorney, Agent, or Firm* — Pearl Cohen Zedek Latzer Baratz LLP

(57) ABSTRACT

A system and method for interpolating seismic data collected by a set of geophones arranged in an irregularly spaced grid by: transforming the collected seismic data by a Radon transform; pre-computing a set of basis function correlation factors by geometrically scaling a spatial geometry of each temporal frequency slice of the transformed seismic data independently by its temporal frequency; computing, solely in the transformed domain, an anti-leakage Radon transform of the seismic data by computing each Radon coefficient independently for each temporal frequency slice using the pre-computed basis function correlation factors, until a relative error between the collected seismic data and an approximation of the collected seismic data based on the Radon coefficients is less than a predetermined convergence threshold; and simulating seismic data collected in a regularly spaced grid by interpolating the anti-leakage Radon transform of the collected seismic data in the irregularly spaced grid.

18 Claims, 7 Drawing Sheets

(56) References Cited

OTHER PUBLICATIONS

Jiang et al., Compressive Seismic Reconstruction with Extended POCS for Arbitrary Irregular Acquisition, 2017 SEG International Exposition and 87th Annual Meeting, pp. 4272-4277 (Year: 2017).*
Google Search Results, Feb. 15, 2021, 2 pp. (Year: 2021).*
One Petro Search Results, Feb. 16, 2021, 9 pp. (Year: 2021).*
Hollander et al., "A Geometry Dependent Lookup Table Approach to Improve Performance of the OMP Seismic Interpolation Method", 79th EAGE Conference & Exhibition 2017, Paris, France, Jun. 12-15, 2017.
Fourmont, Karsten, "Non-Equispaced Fast Fourier Transforms with Applications to Tomography", The Journal of Fourier Analysis and Applications, pp. 431-450, vol. 9, Issue 5, 2003.
Hollander et al., "Seismic Data Interpolation by Orthogonal Matching Pursuit", 74th EAGE Conference & Exhibition incorporating SPE EUROPEC 2012 Copenhagen, Denmark, Jun. 4-7, 2012.
Jahanjooy et al., "A faster method to reconstruct seismic data using anti-leakage Fourier transform", Journal of Geophysics and Engineering, pp. 86-95, vol. 13, Jan. 29, 2016.
Trad et al., "Accurate interpolation with high-resolution time-variant Radon transforms", GEOPHYSICS, pp. 644-656, vol. 67, Issue 2 (Mar.-Apr. 2002).
Trad et al., "Latest views of the sparse Radon transform", GEOPHYSICS, pp. 386-399, vol. 68, Issue 1 (Jan.-Feb. 2003).
Wang et al., "Fast progressive sparse Tau-P transform for regularization of spatially aliased seismic data", SEG Technical Program Expanded Abstracts 2014, pp. 3589-3593.
Whiteside et al., "5D data regularization using enhanced antileakage Fourier transform", SEG Technical Program Expanded Abstracts 2014, pp. 3616-3620.
Xu et al., "Seismic Data Regularization with Anti-Leakage Fourier Transform", EAGE 66th Conference & Exhibition Paris, France, Jun. 7-10, 2004.
Xu et al., "Antileakage Fourier transform for seismic data regularization in higher dimensions", GEOPHYSICS, vol. 75, Issue 6 (Nov.-Dec. 2010).

* cited by examiner

ACCELERATED SEISMIC INTERPOLATION OF MEASURED DATA COLLECTED BY A SET OF GEOPHONES ARRANGED IN AN IRREGULARLY SPACED GRID

FIELD OF THE INVENTION

Embodiments of the invention relate to the field of tomographic scanning, and in particular, geological or seismic tomography for generating an image of the interior subsurface of the Earth based on geological data collected by transmitting a series of incident seismic waves and receiving reflections of those seismic waves at receivers, such as geophones, across geological discontinuities in the subsurface. The incident and reflected waves are reconstituted by a 3D model to generate an image of the reflecting surfaces interior to the Earth. Accordingly, geological or seismic tomography allows geophysicists to "see inside" the Earth without drilling into or disturbing the geology.

Embodiments of the invention further solve the problem of receivers or geophones that are unevenly or irregularly spaced, for example, due to physical obstructions or inaccessible areas in land surveys or due to drift caused by waves in marine surveys, by interpolating or simulating receiver or geophone data to fill in the gaps of the irregular collected tomographic data. New techniques are proposed herein to improve seismic interpolation to generate tomographic images that are more accurate and generated faster than conventional systems. These images may aid geoscientists exploring the subsurface geology for applications such as predicting tectonic motion or earthquakes, or by exploration engineers in the mining or oil and gas industries.

BACKGROUND OF THE INVENTION

Tomography is an imaging technique for displaying a representation of a cross section through a solid object using any kind of penetrating wave. Tomography is used in various areas of science, such as radiology, archaeology, medicine, atmospheric science, geophysics, and oceanography.

For example, in medicine, X-ray computed tomography ("CT") allows a user to see inside an object, such as a person, without cutting into the object by utilizing a computer process that combines many X-ray measurements taken from different angles to produce cross-sectional (tomographic) images of specific areas of the scanned object.

In seismic tomography, geophysicists use seismic waves to create images of the inside of the Earth. However, unlike X-ray computed tomography, where a physician has complete control over the locations of sources and receivers, in seismic tomography geophysicists are limited by the physical geology of the Earth and often cannot access certain locations to place geophones. Irregular field acquisition patterns may result from the presence of natural or man-made obstacles on land, and due to wells and cable drift caused by wind and waves in marine surveys. This can result in an uneven distribution in the location of geophones and thus, poor resolution of images due to missing or limited sampling in inaccessible areas.

Accordingly, there is a need in the art to solve the problem of irregularly placed geophones and improve the accuracy of the tomographic images they generate.

SUMMARY OF THE INVENTION

According to some embodiments of the invention, there is provided a system and a method for interpolating measured seismic data collected by a set of geophones arranged in an irregularly spaced grid. In land acquisition surveys, the set of geophones may be irregularly spaced because of natural or man-made obstructions and interpolating may simulate seismic data which would have been collected if all geophones of the set of geophones were regularly spaced. In marine acquisition surveys, the set of geophones may be irregularly spaced because one or more of the geophones drifts with water current and interpolating may simulate seismic data which would have been collected if all geophones of the set of geophones were stationary. An example of such irregularly measured seismic data collected in a land survey is shown in FIG. 2.

The collected seismic data may be transformed by a Radon transform from a spatial domain to a transform domain in which the seismic data is represented by an initial combination of multidimensional Radon basis functions. The transform domain may be the frequency-Radon ("f-p") domain. The Radon basis functions may represent parabolic data, which are generally the shapes of seismic reflections recorded by the geophones. The Radon transform may thus be a precise and compact way to represent the seismic data.

A set of basis function correlation factors may be pre-computed prior to computing an anti-leakage Radon transform of the seismic data. The transformed seismic data may be divided into a plurality of temporal frequency slices, and a spatial geometry of each temporal frequency slice may be independently scaled geometrically by a temporal frequency of the temporal frequency slice.

The anti-leakage Radon transform of the seismic data may be computed by iteratively progressing slice-by-slice, vertically through the geometrically scaled seismic data, to compute each j'th Radon coefficient independently for each temporal frequency slice using the pre-computed basis function correlation factors. In each iteration, a maximal energy Radon coefficient may be selected and the transformed seismic data may be updated by subtracting the Radon term corresponding to the selected maximal energy Radon coefficient from the transformed seismic data. The next iteration may be reset with the updated transformed seismic data. These slice-by-slice iterations may be repeated throughout each volume for each subsequent j+1th coefficient until a relative error between the collected seismic data and the updated Radon transform approximation thereof is less than a predetermined convergence threshold. An example of such iterative process is described in reference to FIG. 1.

According to embodiments of the invention, the Radon coefficients computed in these iterations may be computed solely in the transform domain based on the pre-computed basis function correlation factors, without reverse transforming to the spatial domain. An example of the benefits of computing the anti-leakage Radon transform of the seismic data exclusively in the transform domain is described in reference to FIGS. 3 and 4, which shows significant processor speed-up.

In some embodiments of the invention, prior to the geometrically scaling, the transformed seismic data may be divided horizontally and vertically into a plurality of mini-volumes, each mini-volume comprising a plurality of the temporal frequency slices. The anti-leakage radon transform may be computed for one vertical column of mini-volumes at a time based on the pre-computed set of basis function correlation factors for only that column, e.g., as described in reference to FIG. 1. When progressing to the next column, the pre-computed current set of basis function correlation factors for the one column may be deleted and the same or overlapping memory space may be overwritten with the pre-computed set of basis function correlation factors for the next column, such that the pre-computed set of basis function correlation factors is only stored at any particular time for the one or more vertical column for which the current anti-leakage radon transform is currently being computed. Re-using the same or overlapping memory for each column's pre-computed basis function correlation factors may significantly reduce the amount of storage used for Radon transforming and interpolating the seismic data, as compared to storing the entire set of pre-computed basis function correlation factors for all columns in the entire model. In one embodiment, the memory reduction may be commensurate with the number of columns in the model. For example, a model divided into 100 column will use about 100 times less memory space for storing the pre-computed basis function correlation factors for only the one column at a time, than if the entire set of pre-computed basis function correlation factors were stored for the entire model.

Once the anti-leakage Radon transform of the seismic data is fully computed (e.g., iterating over a sufficient number of j Radon terms to converge with the measured seismic data and iterating over all slices, mini-volumes, and columns throughout the entire model), the Radon transformed seismic data (collected by the set of geophones arranged in the irregularly spaced grid) may be interpolated to simulate seismic data collected in a regularly spaced grid. An image of the simulated interpolated seismic data may be displayed.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
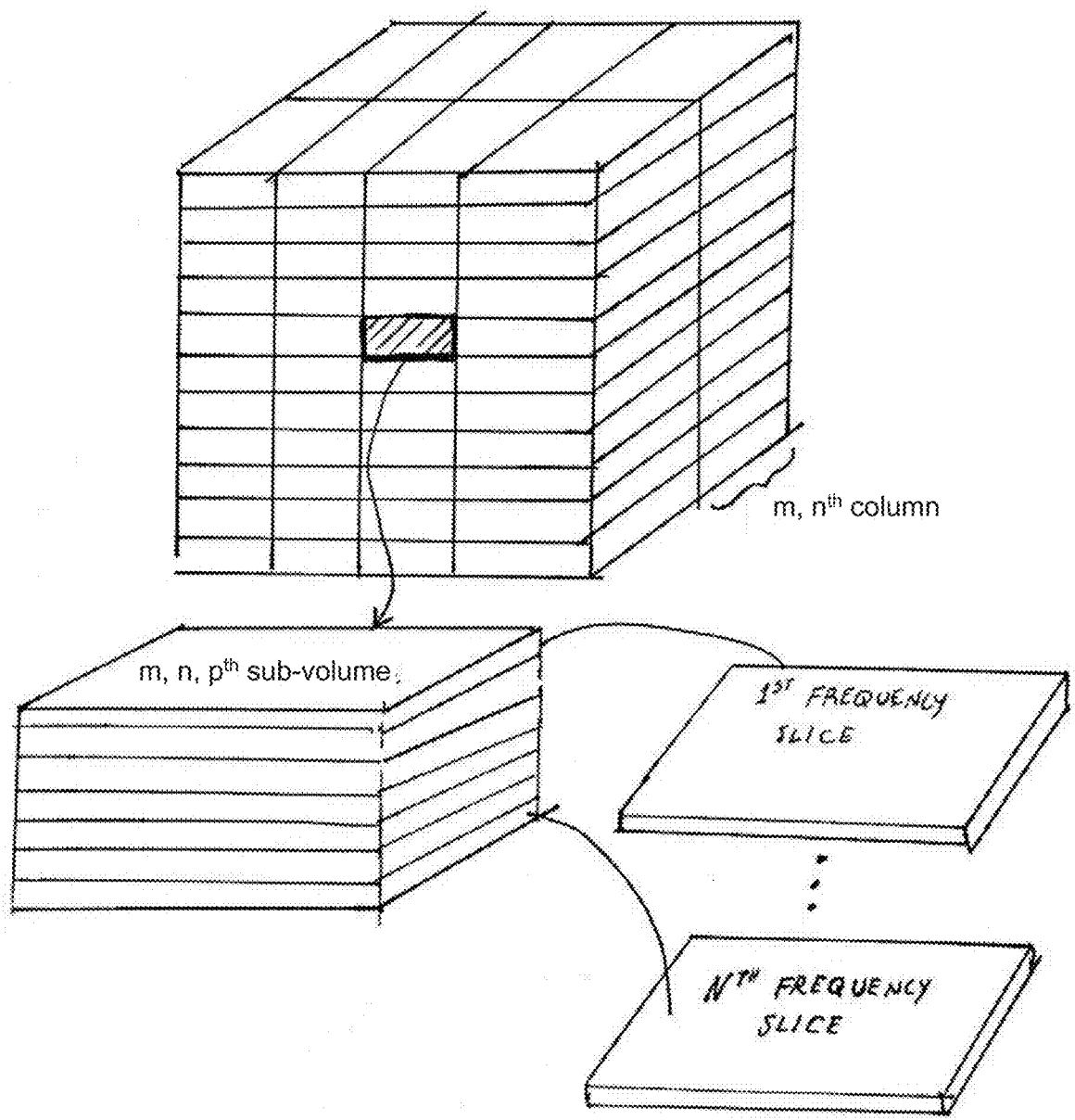
FIG. 1 schematically illustrates data structures for improved interpolation of seismic data collected by irregularly spaced geophones, according to an embodiment of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

Some advanced seismic data processing techniques for seismic exploration, such as 3D wave equation migration techniques and 3D multiple attenuation techniques, require seismic data that is regularly distributed in space. However, in reality, field acquisition patterns are often irregular due to the placement of geophones in the presence of natural or man-made obstacles on the ground or in wells in land surveys or due to cable drift caused by wind and waves in marine surveys. In such cases, the sources and receivers for picking up seismic data may lie on an unstructured grid (e.g., the sources and receivers may not be located at regular spatial intervals along each line of a grid), causing seismic data to be irregularly sampled along spatial axes, which results in missing and poor quality data. Mistreating these sampling irregularities can result in poor imaging of the subsurface, which will affect the accuracy of a tomographic computation to accurately find a proper model for the subsurface.

Embodiments of the invention aim to solve this problem of unevenly spaced receivers or geophones by simulating seismic data to fill in the gaps of the data measured at irregularly spaced intervals. Seismic interpolation may be used to convert seismic data collected at irregularly spaced receivers to simulate seismic data that is continuous across unsampled areas as if it were collected by geophones that were regularly spaced across the studied domain. The result is a multidimensional regularization of the collected seismic data that represents the entire 3D region of the subsurface continuously and evenly across the modeled region of the Earth.

Conventional methods for seismic interpolation, however, suffer from both accuracy and performance problems due to the use of Fourier transforms to interpolate seismic data in Fourier transform space. Fourier based interpolation methods assume a linear relation in time and space of seismic reflection events recorded in a seismic survey. This transform also assumes an independence of data representation in the frequency domain between different frequency slices. This limitation typically requires a huge number of Fourier coefficients to properly represent the measured data that occupy an enormous amount of memory space.

Further, the assumption of independent frequency slices intrinsic to the Fourier transform interpolation approach, often results in an "aliasing effect," where seismic event slopes are wrongly interpreted as their aliased negative counterpart, which in turn results in poor interpolation to unsampled locations. For example, selecting Fourier coefficients for high frequency slices are not guided by Fourier coefficients for lower frequency slices, which are less error prone to aliasing than the high frequency determinations. If some of the higher frequency slices were aliased, it means that the wrong Fourier coefficients or Fourier functions were chosen in those sites. This will result in poor interpolation because these coefficients that were erroneously selected do not accurately capture the true pattern of the input data, and therefore are unable to be used to determine information in unsampled locations. In contrast, if the lower frequency slices and higher frequency slices were coupled, the determination of the coefficients for the low frequency slices, which are less error prone, could be used to reduce the risk of errors in the more error prone calculations to determine the coefficients for the high frequency slices.

To overcome these problems, embodiments of the invention implement a Radon transform interpolation, which represents the data as a combination of parabolic events in time and space. Such representation better fits the seismic data, whose seismic reflections generally also have a parabolic shape as recorded by the receivers. Accordingly, a Radon transform represents the data more precisely and sparsely with fewer terms, as compared to the Fourier transform. The Radon transform also relates coefficients between different frequency slices, which in turn reduces or eliminates aliasing. Such embodiments improve the accuracy of seismic interpolation by reducing or eliminating the aliasing effect and improve memory efficiency because fewer Radon terms are needed to approximate parabolic seismic events.

Another problem of conventional interpolation methods is that the computation of coefficients to represent the data in the transform space is an iterative process that switches back and forth between the original spatial domain, in which the data is measured, and the (Fourier or Radon) transformed domain. This switching back and forth between domains, which is typically repeated tens of thousands of times for a standard analysis, is prohibitively complex and time consuming. For example, iterative calculations of irregular forward and backward discrete Fourier transforms (DFT) generally have a computational complexity of $O(N_x N_k)$, where $N_x$ is the number of spatial samples and $N_k$ is the number of spatial frequencies.

Figure 4:
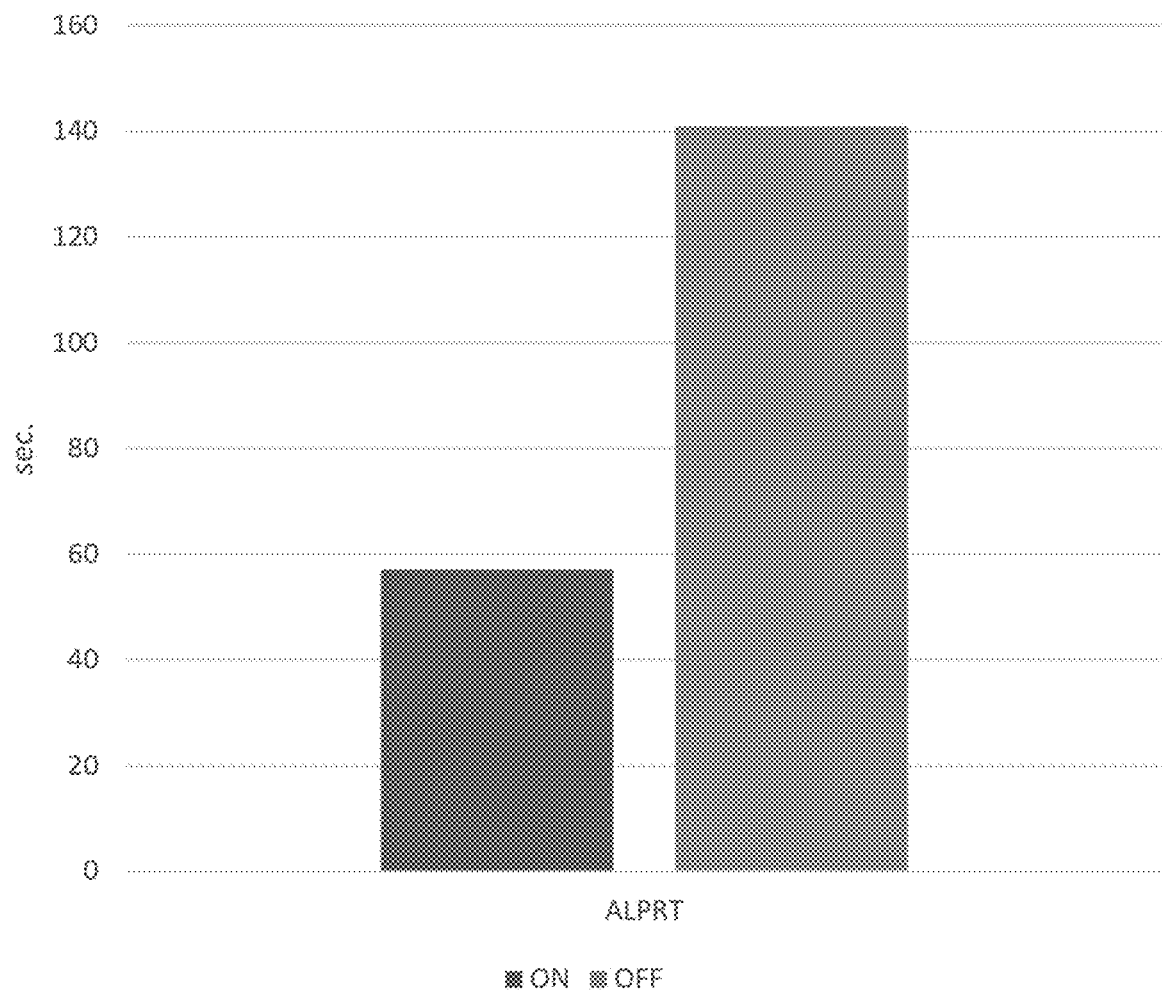
FIG. 4 is a graph showing experimental results comparing a longer processor runtime for performing the conventional interpolation of FIG. 3(a) (right bar, taking over 140 seconds) and a significantly faster processor runtime for performing the inventive interpolation of FIG. 3(b) (left bar, taking less than 60 seconds).

Embodiments of the present invention aim to reduce this complexity by performing a pre-computation of a correlation pattern between all transform basis functions and using that correlation pattern to calculate the transformation coefficients solely in the frequency-Radon coefficient ("f-p") domain. A pre-computation of the correlation pattern between all transform basis functions allows the computation of the Radon coefficients to be done only in the transformed domain, without the need to go back and forth between different domains. In addition, due to the nature of the Radon basis functions, the number of unique correlation factors or leakage patterns between the Radon basis functions is tremendously lower than the actual square number of basis functions that participate in the analysis. Eliminating the need to switch back and forth between the original and transform domains significantly speeds up performing a Radon transform based interpolation and is often obtained by the pre-computation of only a handful of correlations factors. As shown in FIG. 4, experimental results show that computing the Radon transform solely in the transformed domain yields a computational speed-up of 2.5 times the speed required to perform the Radon transform by switching back-and-forth between the transform and spatial spaces.

However, pre-computing all transform basis function correlation factors presents other problems due to the memory required to store these correlation factors. For the Fourier transform the correlation factors between the basis functions is constant across the vertical frequency dimension of the transform space. The Radon transform, however, requires a different set of basis functions for each temporal frequency, and hence different correlation factors. This means that for the Radon transformation, the correlation factors are computed throughout the entire volume rather than for a single slice, as in the case of the Fourier transform. This results in a huge increase in the memory space used to perform the Radon transform as compared to the Fourier transform.

This significant increased memory requirement is further exacerbated by the seismic data processing technique of dividing a solved multi-dimensional domain to mini-volumes in time and space to allow for better localization of the problem and results in more accurate and robust models. Dividing the seismic volume into number of sub volumes aggravates the memory problem described above because the correlation factor volumes for the Radon transform would need to be computed for many mini-volumes, which typically amount to, e.g., around 150. Calculating this number of distinct correlation factor volumes would consume an enormous amount of memory space and slow down computations due to burdensome memory management, which would hence render such a process impractical on conventional processors and memory units.

Embodiments of the invention solve this problem by exploiting the feature that the Radon transformation basis function correlation factors depend only on the spatial geometry of the recording receivers. Because the vertical axes (e.g., time dimension) is sampled regularly, there is no leakage of energy between the different frequency slices that participate in the analysis. As a result, the correlation factor volumes do not change across mini-volumes that belong to one vertical column. Accordingly, embodiments of the invention compute the correlation factor volumes one vertical column at a time, only storing a volume for the column of data being computed at any one time. After all Radon coefficients for a current vertical column of data are computed, its associated correlation factor volume is deleted and replaced by the one associated with the next column. In this way, the memory requirements for storing the pre-computed correlation factors are significantly reduced to allow fast, efficient and accurate Radon transformations and seismic interpolation. Compared to a naïve representation of the problem that requires the pre-computation of a correlation factor volume for each mini-volume solved, in the modified approach described here where only one such volume is stored in memory, the overall memory space is reduced by a factor of the number of mini-volumes participating in the analysis (e.g., typically around 150).

Embodiments of the invention thus provide techniques to efficiently and accurately interpolate multidimensional seismic data sampled from an irregular grid of receivers exclusively in the transformed domain in order to improve the efficiency and memory requirements of the seismic interpolation process.

Reference is made to FIG. 1, which schematically illustrates data structures for improved interpolation of seismic data collected by irregularly spaced geophones, ac cording to an embodiment of the invention.

The collected seismic data may be transformed by a Radon transform from a spatial domain to a transform domain, in which the seismic data is represented by an initial combination of multidimensional Radon basis functions, for example, as follows:

$$\hat{d}(t, x) \cong \sum_{j=1}^{\hat{j}} \hat{m}_j e^{i 2\pi f_j x^2 \cdot p_{j_e}} e^{i 2\pi f_j t} \tag{EQN. 1}$$

where t and $f_j$ denote the vertical regularly sampled dimension in the time and frequency domains, respectively; x is the irregular 4D spatial grid; $p_j$ is the 4D wave number vector, which represents the coefficient of the quadratic term of the parabolas that compose the transform; i is the imaginary unit; and $\hat{m}_j$ is the j'th Radon coefficient (j=1 . . . f) in the series that approximates the input data corresponding to the frequency f and wave number $p_j$.

The time domain seismic data may be divided into a plurality of vertical columns, as can be seen in FIG. 1. Each vertical column (m,n) may be divided into a plurality of mini-volumes (m,n,p). Each mini-volume may be divided into a plurality of temporal frequency slices (1, . . . , N) by performing a vertical fast Fourier transform (FFT).

Starting with a first column, as shown in FIG. 1, for each temporal frequency slice, its spatial geometry may be geometrically scaled by the unique temporal frequency of the temporal frequency slice, for example, as follows:

$$d(f,x) \cong \Sigma_{j=1}^{J} \hat{m}_j e^{i2\pi f x^2 \cdot p_j} = Am \quad \text{(EQN. 2)}$$

where $m_j$ is the j'th Radon coefficient (j=1 . . . J); m is the vector of Radon coefficients for a particular frequency f; and A is a matrix which contains, in its columns, the corresponding Fourier basis functions sampled at the irregular 4D spatial grid x, which is called by the temporal frequency f.

The leakage patterns may be basis function correlation factors which represent the temporal frequency dependent spectral leakage patterns between all of the multi-dimensional Radon transform basis functions that participate in the analysis (e.g., the maximal values determined for j for each series in EQN. 2). The leakage patterns for each temporal frequency slice is unique because each Fourier function is sampled differently for each frequency.

The pre-computation of leakage patterns may be calculated and stored one column at a time. For each vertical column, a current set of basis function correlation factors for the mini-volumes of a current column may be stored. The current set of basis function correlation factors computed for that current column may be utilized to compute a current anti-leakage radon transform on only the mini-volumes in the current vertical column before progressing to a next column.

A unique leakage pattern each column that is used to calculate coefficients for all mini-volumes and slices belonging to that column.

An anti-leakage Radon transform of the seismic data may be generated by performing iterative calculations, using the pre-calculated leakage pattern volumes for the columns, without performing forward and backward transformations between the Radon and spatial domains. The iterative process is performed on one column at a time until a convergence threshold is met.

Starting with the first column, iterative calculations may be performed on the frequency slices in the first column to compute an anti-leakage transform of the seismic data for the first column using the pre-calculated leakage pattern volume for that column.

The first step in the iterations for a given mini-volume in a particular column may be to, for each frequency slice, perform only one spatial forward transform of the input data in the mini-volume and transform d(f,x) to $v^{(0)}$.

The next step in the iterations for a given mini-volume may be to update the coefficient vector m and append the dominant Radon coefficients in $v^{(it)}$ for the current iteration it to the existing coefficient vector (regarding $m^{(0)}$ as an empty vector), for example, as follows:

$$m^{(it)} = [m^{(it-1)}, v_l^{(it)}], \text{ with } l = [p] \text{argmax} |v_p^{(it)}| \quad \text{(EQN. 3)}$$

The next step in the iterations for a given mini-volume may be, for each frequency slice, to calculate a vector of Radon coefficients of a residual between the input data and the approximation in a given iteration by not performing any backward transformations, for example, as follows:

$$v^{(it+1)} = F^*(d - A^{(it)} m^{(it)}) = v^{(0)} - F^* A^{(it)} m^{(it)} \quad \text{(EQN. 4)}$$

where $v^{(it+1)}$ is the residual, in the transform domain, between the input data and the approximation in the next iteration, F is a matrix which contains in its columns the entire range of Radon basis functions sampled over the spatial 4D grid for all wave-numbers available for the analysis; d is the input data at a particular frequency slice; and ( )* is the Hermitian transpose operator.

The multiplication $F^* A^{(it)}$ represents the leakage pattern between the Fourier functions associated with the coefficients picked up to a certain iteration, and all other Fourier functions that participate in the analysis (e.g., the maximal values determined for j for each series in EQN. 2). The matrix $F^* A^{(it)}$ may be a sub-matrix of the full $F^* F^{(it)}$ matrix, which represents the leakage of all Fourier functions that can potentially be picked in the iterative process. The $F^* A^{(it)}$ sub matrix may contain the pre-computed values to allow for updating the coefficient vector m and appending the dominant coefficient in v to the existing coefficient vector, as shown in EQN. 3, without the need to go back and forth between spatial and transform domains.

Because the matrix $F^* F^{(it)}$ has a Toeplitz structure, calculating its first column by the forward transform of a Dirac Comb is sufficient to obtain all of the possible values this matrix contains. This means that building the matrix $F^* A$ for the purpose of updating the dominant coefficient v in EQN. 4 may be accomplished by simply using known values in that first columns of $F^* F$, and does not involve any further computation.

The Radon coefficients for the current column may be computed solely in the Radon domain based on the pre-computed basis function correlation factors (e.g., the current leakage pattern volume $F^* F^{(it)}$) without reverse transforming to the spatial domain. The computed final Radon coefficients for the current column may be stored.

The iterative steps for a given mini-volume in a particular column continue until a relative error between the collected seismic data and an approximation of the collected seismic data by the Radon coefficients is less than a predetermined convergence threshold. For example, the iterative loop for a given column may be terminated when a ratio of a maximal norm of the collected seismic data $\|v^{(it)}\|_2$, at an iteration it, and a maximal norm of the approximation among all frequency slices in the input (e.g., 5D) volume of the collected seismic data $\|v^{(0)}\|_2^{max}$ is less the predetermined convergence threshold $\in$, defined externally by a user:

$$\frac{\|v^{(it)}\|_2}{\|v^{(0)}\|_2^{max}} < \epsilon \quad \text{(EQN. 5)}$$

Once the final Radon coefficients for the current column are calculated (e.g., the convergence for the anti-leakage Radon transform for a given column is determined), the pre-computed current set of basis function correlation factors for the current column may be deleted and/or overwritten by a next current set of basis function correlation factors calculated for the next column, such that the current set of basis function correlation factors is only stored in memory at any particular time for the current vertical column for which the current anti-leakage radon transform is currently being computed. In other words, a leakage pattern volume for the entire column (e.g., a leakage pattern for each mini-volume in the column) is only stored and used when calculating the Radon coefficients for that column.

This process may continue column by column until the final Radon coefficients for each column have been calculated. Once the anti-leakage Radon transform of the irregularly spaces seismic data is computed for the entire model, this data may be interpolated to simulate seismic data which would have been collected if the set of geophones were arranged in a regularly spaced grid.

Figure 2:
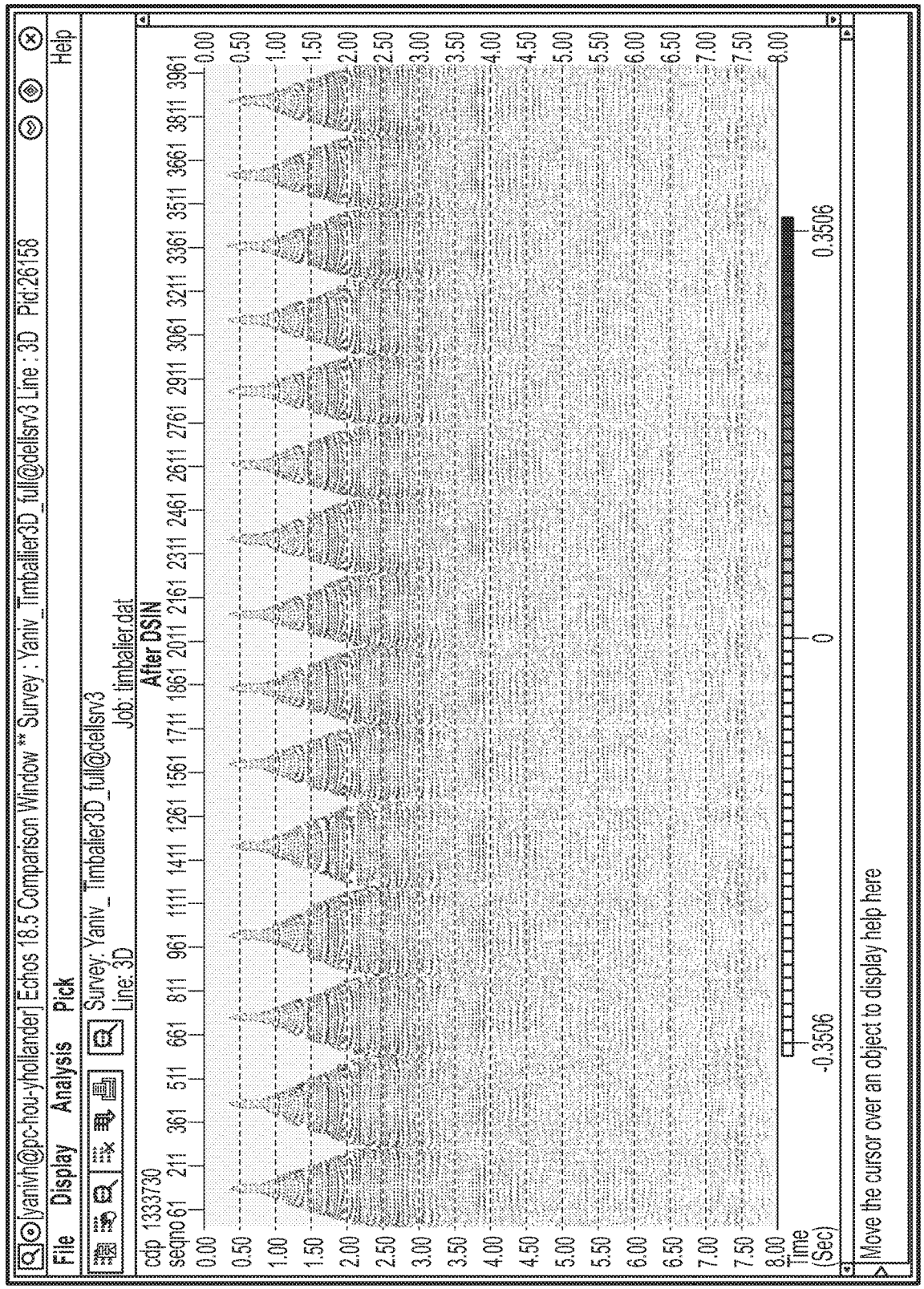
FIG. 2 schematically illustrates example input seismic data comprising a "supergather" of 15 seismic gathers input into the interpolator, according to an embodiment of the invention.

Reference is made to FIG. 2, which schematically illustrates example input seismic data comprising a "supergather" of multiple (e.g., 15) seismic gathers input into the interpolator, according to an embodiment of the invention. The 15 cdp gathers may represent gathers of data common to 5 crosslines along 3 inlines. This supergather is represented in a time-spatial domain. The supergather may be transformed to the frequency-Radon coefficient ("f-p") domain and utilized as the input for EQN. 2. The transformed supergather may be divided into a plurality of vertical columns, mini-volumes, and temporal frequency slices as can be seen in FIG. 1.

Figure 3:
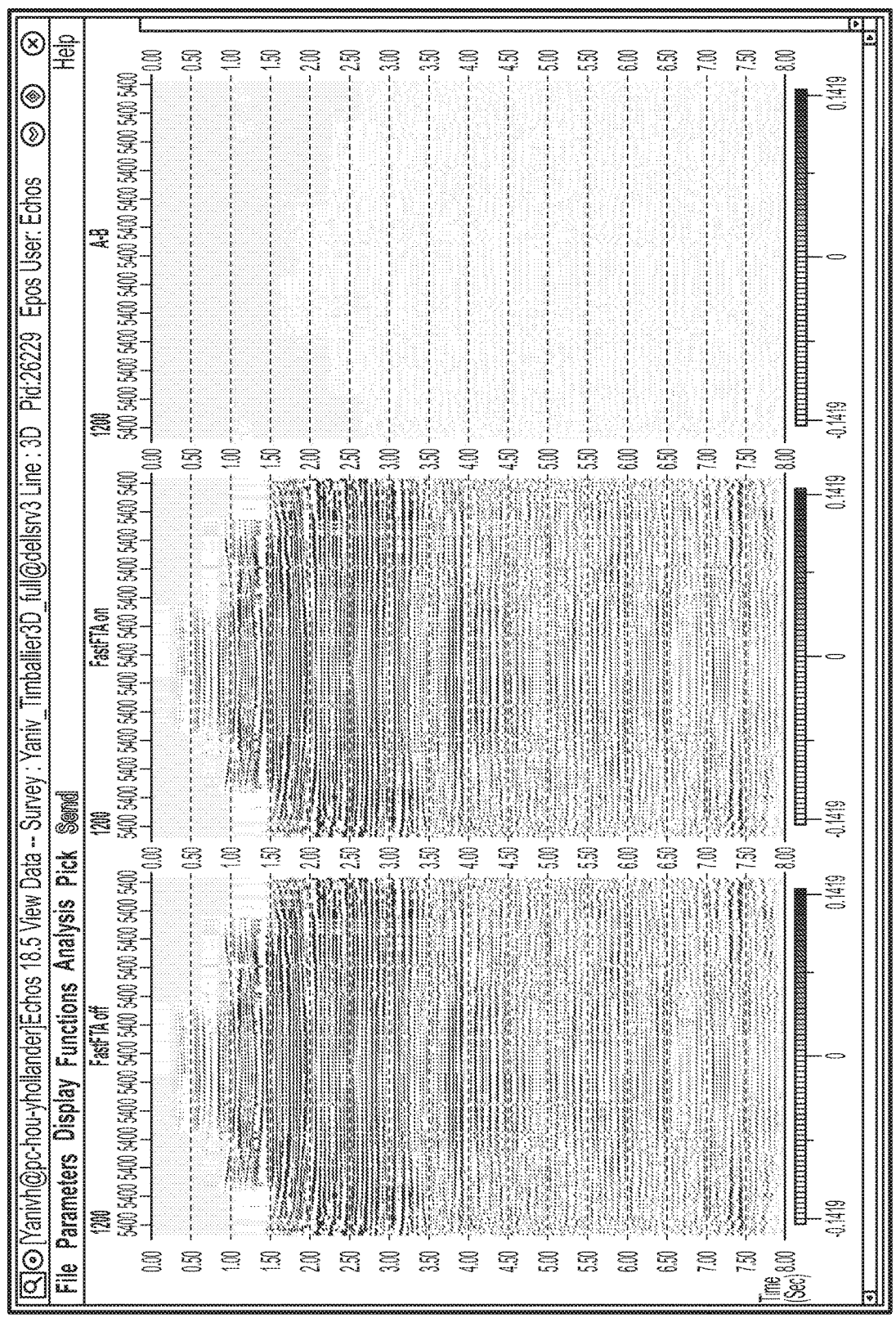
FIG. 3 shows experimental results comparing an output gather generated by (a) a conventional (slow) interpolator and (b) an inventive (fast) interpolator, both interpolating the input data of FIG. 2, and (c) a negligible difference between the results of (a) and (b).

Reference is made to FIG. 3, which shows experimental results comparing an output gather generated by (a) a conventional (slow) interpolator and (b) an inventive (fast) interpolator, both interpolating the input data of FIG. 2, and (c) a negligible difference between the results of (a) and (b).

Result (a) may be an example of the gather generated by interpolating seismic input data, such as the group of gathers shown in FIG. 2, by switching back and forth between spatial and transform domains. Result (b) may be an example of the gather generated by interpolating seismic input data, such as the group of gathers shown in FIG. 2, according to embodiments of the invention exclusively in the transform domain (e.g., utilizing the pre-calculated leakage pattern volume) without iteratively transforming back and forth between different domains. Interpolated gathers (a) and (b) transform the seismic data to new spatial locations that do not exist in the original gathers in FIG. 2. Result (c) is a comparison of the difference between gather (a) and gather (b), showing that the same result is achieved (e.g., substantially zero difference) by remaining in the transform domain (to generate gather (b)) as when the transform is computed by switching back and forth between domains (to generate gather (a)).

Reference is made to FIG. 4, which is a graph showing experimental results comparing a longer processor runtime for performing the conventional interpolation of FIG. 3(a) (right bar, taking over 140 seconds) and a significantly faster processor runtime for performing the inventive interpolation of FIG. 3(b) (left bar, taking less than 60 seconds).

The right bar in FIG. 4 corresponds to the amount of time for conventional interpolation techniques, e.g., to generate the gather in result (a) of FIG. 3. The left bar in FIG. 4 corresponds to the amount of time for interpolation according to embodiments of the invention, e.g., to generate the gather in result (b) of FIG. 3. This time measures the total duration used to calculate the Radon transform, and then interpolate the data in the spatial domain.

The experimental results show that embodiments of the invention (e.g., computing the Radon transform solely in the transformed domain) yields a computational speed-up of approximately 2.5 times the speed required to perform the Radon transform by switching back-and-forth between the transform and spatial spaces. Thus, FIGS. 3-4 show that, while embodiments of the invention increase the speed and decrease the amount of memory needed to interpolate seismic data, those embodiments do not degrade the accuracy when compared to slower and more computationally and memory heavy techniques.

Figure 5:
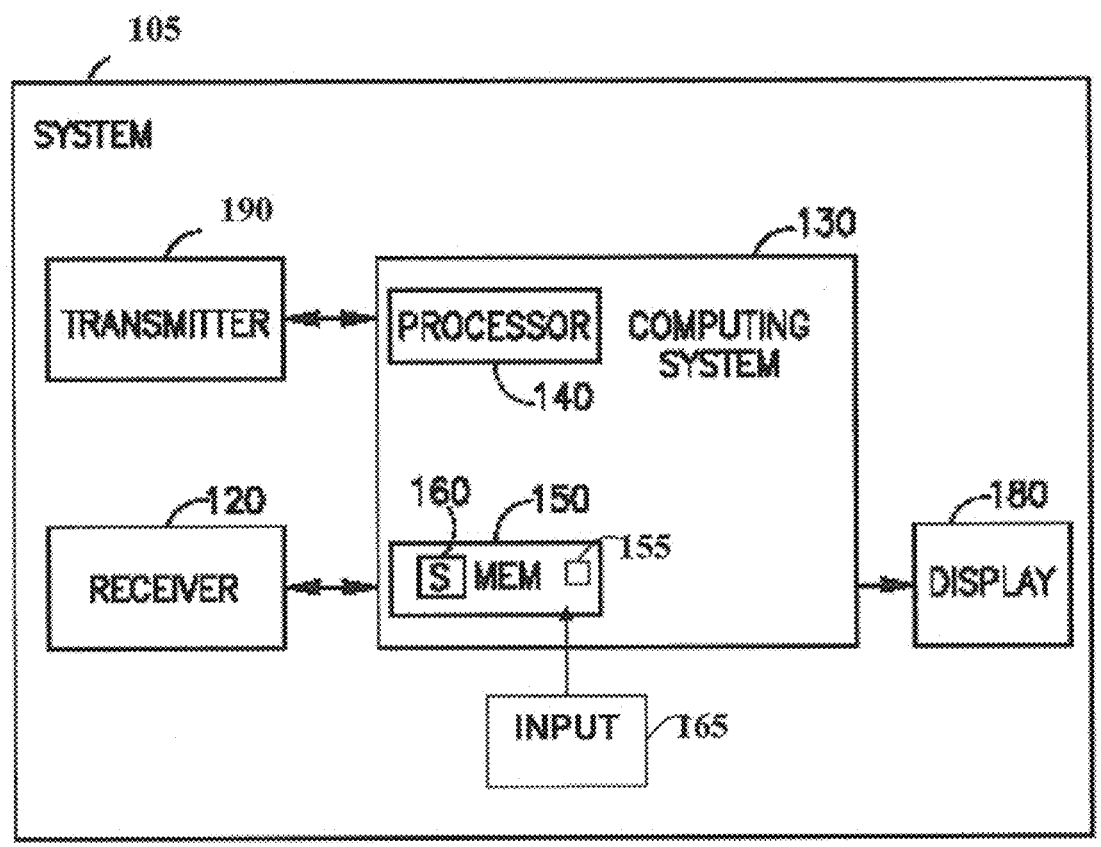
FIG. 5 schematically illustrates a system for improved interpolation of seismic data collected by irregularly spaced geophones, according to an embodiment of the invention.

Reference is made to FIG. 5, which schematically illustrates a system 105 for performing seismic data regularization, according to an embodiment of the invention.

System 105 may include one or more transmitter(s) 190, one or more receiver(s) 120, a computing system 130, and a display 180.

The one or more receiver(s) 120 may be configured to receive measured seismic data collected by a set of geophones arranged in an irregularly spaced grid. The set of geophones may be arranged in an irregularly spaced grid because of natural or man-made obstructions in land acquisition surveys. In some embodiments of the invention, the set of geophones may be arranged in an irregularly spaced grid because one or more of the geophones drifts with current during marine acquisition surveys.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 measured by the set of geophones and received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, magnetic tape, or other suitable memory units or storage units. Memory 150 may store instructions (e.g., software 160) and data 155 to execute embodiments of the aforementioned methods, steps and functionality (e.g., in long term memory, such as a hard drive). Data 155 may include, for example, raw seismic data collected by receiver 120, a set of basis function correlation factors which represent the temporal frequency dependent spectral leakage patterns between all of the multidimensional Radon transform basis functions, and any instructions necessary to perform the disclosed embodiments of the present invention. In some embodiments, memory 150 may only store basis function correlation factors as data 155 for one or more columns currently being transformed. Data 155 may also include intermediate data generated by these processes and data to be visualized, such as data representing graphical models to be displayed to a user. Memory 150 may store intermediate data, System 130 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 130 may include a computing module having machine-executable instructions. The instructions may include, for example, a data processing mechanism (including, for example, embodiments of methods described herein) and a modeling mechanism. These instructions may be used to cause processor 140 using associated software 160 modules programmed with the instructions to perform the operations described. Alternatively, the operations may be performed by specific hardware that may contain hardwired logic for performing the operations, or by any combination of programmed computer components and custom hardware components.

Embodiments of the invention may include an article such as a non-transitory computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Display 180 may display data from transmitter 190, receiver 120, or computing system 130 or any other suitable systems, devices, or programs, for example, an imaging program or a transmitter or receiver tracking device. Display 180 may include one or more inputs or outputs for displaying data from multiple data sources or to multiple displays. For example, display 180 may display a simulation of a 3D model which would have been generated if geophones which collected the seismic data where arranged in a regularly spaced grid when the seismic data was collected.

Input device(s) 165 may include a keyboard, pointing device (e.g., mouse, trackball, pen, touch screen), or cursor direction keys, for communicating information and command selections to processor 140. Input device 165 may communicate user direction information and command selections to the processor 140.

Processor 140 may include, for example, one or more processors, controllers or central processing units ("CPUs"). Software 160 may be stored, for example, in memory 150. Software 160 may include any suitable software, for example, DSI software.

A method for interpolating the measured seismic data received by receiver 120 may be performed by software 160 being executed by processor 140 manipulating the data. The interpolating of the measured seismic data may simulate seismic data which would have been collected if A geophones of the set of geophones were regularly spaced and/or if all geophones of the set of geophones were stationary.

The processor 140 may be configured to transform the collected seismic data by a Radon transform from a spatial domain to the Radon domain (a transform domain in which the seismic data is represented by an initial combination of multidimensional Radon basis functions).

The processor 140 may be configured to transform a time dimension of the collected seismic data into a temporal frequency dimension.

The processor 140 may be configured to pre-compute a set of basis function correlation factors which represent the temporal frequency dependent spectral leakage patterns between all of the multidimensional Radon transform basis functions.

The pre-computation may include the processor 140 dividing the transformed seismic data into a plurality of vertical columns, as can be seen in FIG. 1. The processor 140 may divide each vertical column into a plurality of mini-volumes. The processor 140 may divide each mini-volume into a plurality of temporal frequency slices by performing a vertical fast Fourier transform (FFT).

For each vertical column, the processor 140 may scale a spatial geometry of each temporal frequency slice independently by the corresponding temporal frequency of that temporal frequency slice.

The pre-computation may be performed by the processor 140 one column at a time. For each vertical column, the processor 140 may compute and the memory 150 may store a current set of basis function correlation factors for the mini-volumes of a current column. The current set of basis function correlation factors computed for that current column may be utilized to compute a current anti-leakage radon transform on only the mini-volumes in the current vertical column before progressing to a next column. When progressing to the next column, the processor 140 may be configured to delete the pre-computed current set of basis function correlation for a previous column from memory 150 and overwrite the same or overlapping memory space in memory 150 with a next current set of basis function correlation factors calculated for the next column, such that the current set of basis function correlation factors is only stored in memory 150 at any particular time for the current vertical column for which the current anti-leakage radon transform is currently being computed. In other words, the processor 140 may be configured to calculate and memory 150 may be configured to store a leakage pattern volume for the entire column (e.g., a leakage pattern for each mini-volume in the column) which is only stored and used when calculating the Radon coefficients for that column.

Once the processor 140 has calculated and stored the current set of basis function correlation factors for the current column as a current leakage pattern volume in memory 150, the processor 140 may iteratively progress slice-by-slice, vertically through the temporal frequency slices of seismic data, each of which had its spatial geometry scaled by its respective frequency, to compute each j'th Radon coefficient independently for each temporal frequency slice using the current leakage pattern volume. At each step the most dominant coefficient may be chosen, and its projection back to the spatial domain may be subtracted from the original data to form a residual from which the most dominant coefficient may be picked in the next iteration. For example, for each iteration, the processor 140 may be configured to update the coefficient vector m and append the dominant coefficient in $v^{(it)}$ to the existing coefficient vector (regarding $m^{(0)}$ as an empty vector) stored in memory 150, as can be seen in EQN. 3

The processor 140 may be configured to calculate a vector of Radon coefficients of a residual between the input data and the approximation in a given iteration by performing only one spatial forward transform of the input data at a given column using EQN. 4, and not performing any backwards transformation.

For Radon transformation, the Fourier functions are sampled differently for each frequency slice because, for each slice, the underlying geometry is scaled by the value of the temporal frequency f. This means that the matrix F is unique for each f.

For each iteration, the processor 140 may update the forward transform of the residual $v^{(it)}$ in EQN. 4 for a particular frequency f by adding a column to the matrix $F*A^{(it)}$ which depends on the coefficient that was picked in that iteration. The values composing the column may be taken from the leakage pattern volume F*F.

The processor 140 may be configured to compute a new transformed residual volume $v^{(it)}$ by using EQN. 4.

These iterative steps may be repeated for each subsequent j+1th coefficient until a relative error between the collected seismic data and an approximation of the collected seismic data by the Radon coefficients is less than a predetermined convergence threshold. For example, the processor 140 may be configured to terminate the iterative loop for the current column when a ratio of a maximal norm of the collected seismic data $\|v^{(it)}\|_2$, at an iteration it, and a maximal norm of the approximation among all frequency slices in the input 5D volume of the collected seismic data $\|v^{(0)}\|_2^{max}$ is less the predetermined convergence threshold $\in$, defined externally by a user.

The processor 140 may compute the Radon coefficients for the current column solely in the Radon domain based on the pre-computed basis function correlation factors (e.g., the current leakage pattern volume), without reverse transforming to the spatial domain. The pre-computed basis function correlation factors may be stored as a matrix F*F that represents all correlation factors between the Radon basis functions that can potentially participate in the collection of coefficients of the transform for a particular frequency slice. Storing a matrix F*F for all frequency slices in the volume requires an enormous amount of data and occupies a huge amount of memory. The pre-computed basis function correlation factors F*F may be used to generate a sub-matrix F*A by taking columns of F*F that correspond to the coefficients the transform picked up to a certain iteration. However, since the matrix F*F is too large to efficiently calculate in its entirety, it is impractical for embodiments of the invention to use columns from it to build F*A. In some embodiments, these added columns to F*A may be computed quickly by exploiting the property that F*F has a Teoplitz structure. This means only a single column needs to be calculated (e.g., out of tens of thousands of columns in F*F) to determine the value of each of its elements. Each single column may be calculated as a pre-process to calculate the leakage patterns/correlation factors of the Radon transform. This allows a fast and efficient computation of F*A on-the-fly from iteration to iteration.

Accordingly, the memory 150 may store the computed final Radon coefficients for the current column. Once the processor 140 has computed the final Radon coefficients for the current column, the processor 140 may delete the pre-computed current set of basis function correlation factors for the current column from memory 150 and overwrite the same or overlapping memory space in memory 150 with a next current set of basis function correlation factors calculated for the next column, such that the current set of basis function correlation factors is only stored in memory 150 at any particular time for the current vertical column for which the current anti-leakage radon transform is currently being computed.

Figure 7:
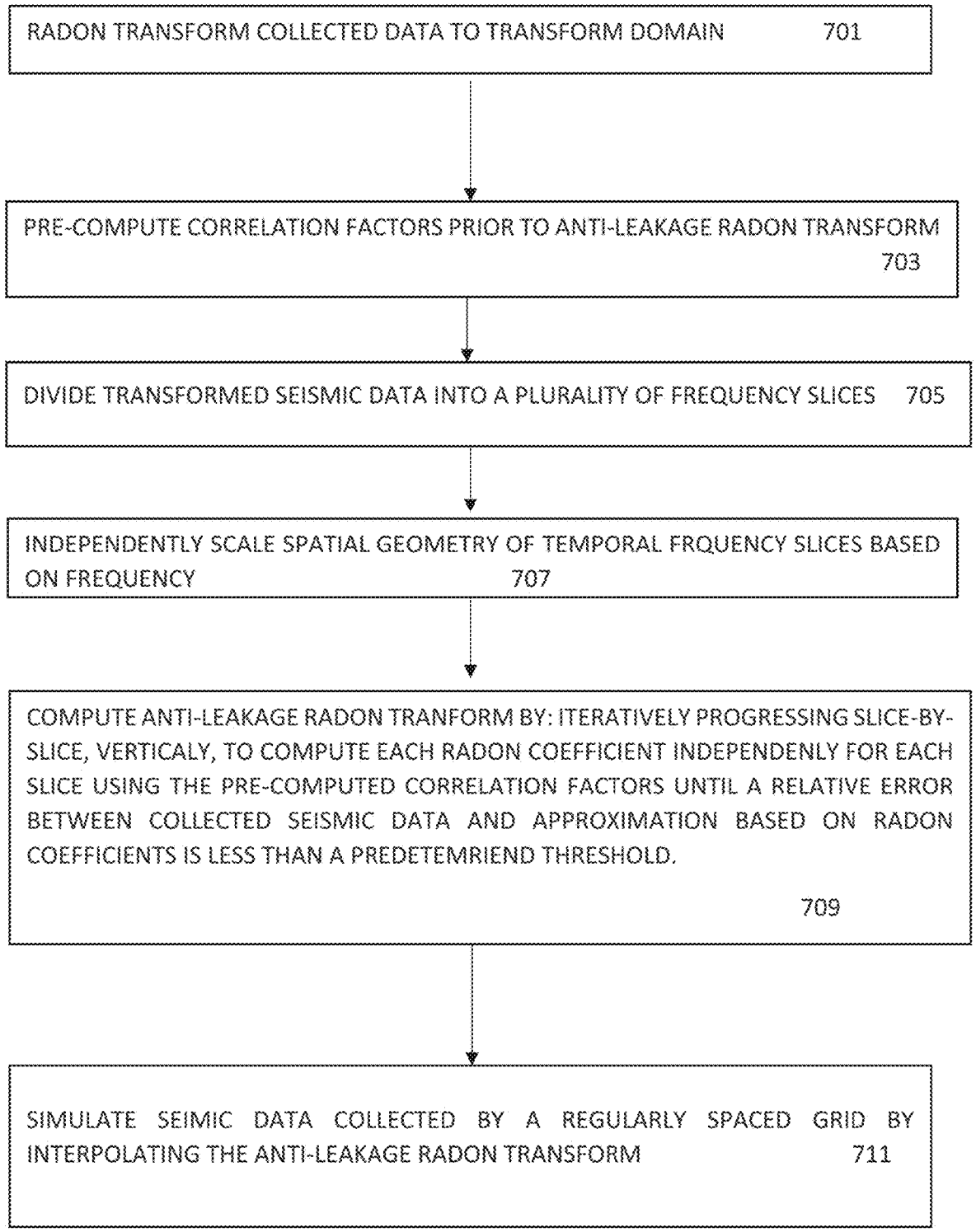
FIG. 7 is a flowchart of a method for improved interpolation of seismic data collected by irregularly spaced geophones, according to an embodiment of the invention.

Reference is made to FIG. 7, which is a flowchart of a method for interpolating measured seismic data collected by a set of geophones arranged in an irregularly spaced grid, according to an embodiment of the invention. Operations 701-711 may be performed by one or more processors (e.g., 140 of FIG. 5).

In operation 701, a processor (e.g., 140 of FIG. 5) may perform a transform seismic data, which was collected by a set of geophones arranged in an irregularly spaced grid, by a Radon transform from a spatial domain to a transform domain in which the seismic data is represented by an initial combination of multidimensional Radon basis functions.

The set of geophones may be arranged an irregularly spaced grid because of natural or man-made obstructions in land acquisition surveys; and said interpolating simulates seismic data which would have been collected if all geophones of the set of geophones were regularly spaced. The set of geophones may be arranged in an irregularly spaced grid because one or more of the geophones drifts with current during marine acquisition surveys; and said interpolating simulates seismic data which would have been collected if all geophones of the set of geophones were stationary. In some embodiments of the invention, the Radon basis functions represent parabolic data.

In operation 703, the processor (e.g., 140 of FIG. 5) may pre-compute a set of basis function correlation factors prior to computing an anti-leakage Radon transform of the seismic data.

In operation. 705, the processor (e.g., 140 of FIG. 5) may divide the transformed seismic data into a plurality of temporal frequency slices. In some embodiments of the invention, the processor may divide the transformed seismic data horizontally and vertically into a plurality of mini-volumes before dividing each mini-volume into a plurality of temporal frequency slices.

In operation 707, the processor (e.g., 140 of FIG. 5) may geometrically scale a spatial geometry of each temporal frequency slice independently by a temporal frequency of the temporal frequency slice.

In operation 709, the processor (e.g., 140 of FIG. 5) may compute the anti-leakage Radon transform of the seismic data by iteratively progressing slice-by-slice, vertically through the geometrically scaled seismic data, to compute each jth Radon coefficient independently for each temporal frequency slice using the pre-computed basis function correlation factors. The process may repeat iteratively progressing for each subsequent j+1th coefficient until a relative error between the collected seismic data and an approximation of the collected seismic data based on the Radon coefficients is less than a predetermined convergence threshold. The processor may compute the Radon coefficients solely in the transform domain based on the pre-computed basis function correlation factors, without reverse transforming to the spatial domain. The transform domain may be the frequency-Radon ("f-p") domain.

In some embodiments of the invention, the processor may compute the anti-leakage radon transform for one vertical column of mini-volumes at a time based on the pre-computed set of basis function correlation factors for only that column. When progressing to the next column, the processor may delete the pre-computed current set of basis function correlation factors for the one column stored in a memory (e.g., 150 from FIG. 5) and overwriting the same or overlapping memory space with the pre-computed set of basis function correlation factors for the next column, such that the pre-computed set of basis function correlation factors is only stored in the memory at any particular time for the vertical column for which the current anti-leakage radon transform is currently being computed.

In some embodiments of the invention, in each iteration, the processor selects a maximal energy Radon coefficient, updates the transformed seismic data by subtracting the Radon term corresponding to the selected maximal energy Radon coefficient, and resets the next iteration with the updating transformed seismic data.

In some embodiments of the invention, the processor may terminate the iterative steps when a relative error between the measured seismic data and its approximation by the computed the anti-leakage Radon transform of the seismic data is within a predetermined threshold.

In operation 711, the processor (e.g., 140 of FIG. 5) may simulate seismic data collected in a regularly spaced grid by interpolating the anti-leakage Radon transform of the seismic data collected by the set of geophones arranged in the irregularly spaced grid. The processor may display on a display (e.g., 180 of FIG. 5) an image of the simulating seismic data.

Other operations or orders of operations may be used.

Geological models are generated using geological or seismic tomography technology. Geological tomography generates a model of the subsurface of the Earth for the purpose of imaging based on geological data collected by transmitting a series of incident waves and receiving reflections of those waves across discontinuities in the subsurface. A transmitter may transmit signals, for example, acoustic waves, compression waves or other energy rays or waves, that may travel through subsurface structures. The transmitted signals may become incident signals that are incident to subsurface structures. The incident signals may reflect at various transition zones or geological discontinuities throughout the subsurface structures, such as, faults or horizons. The reflected signals may include seismic events. A receiver may collect data, for example, reflected seismic events. The data may be sent to a modeling mechanism that may include, for example, a data processing mechanism and an imaging mechanism.

Figure 6:
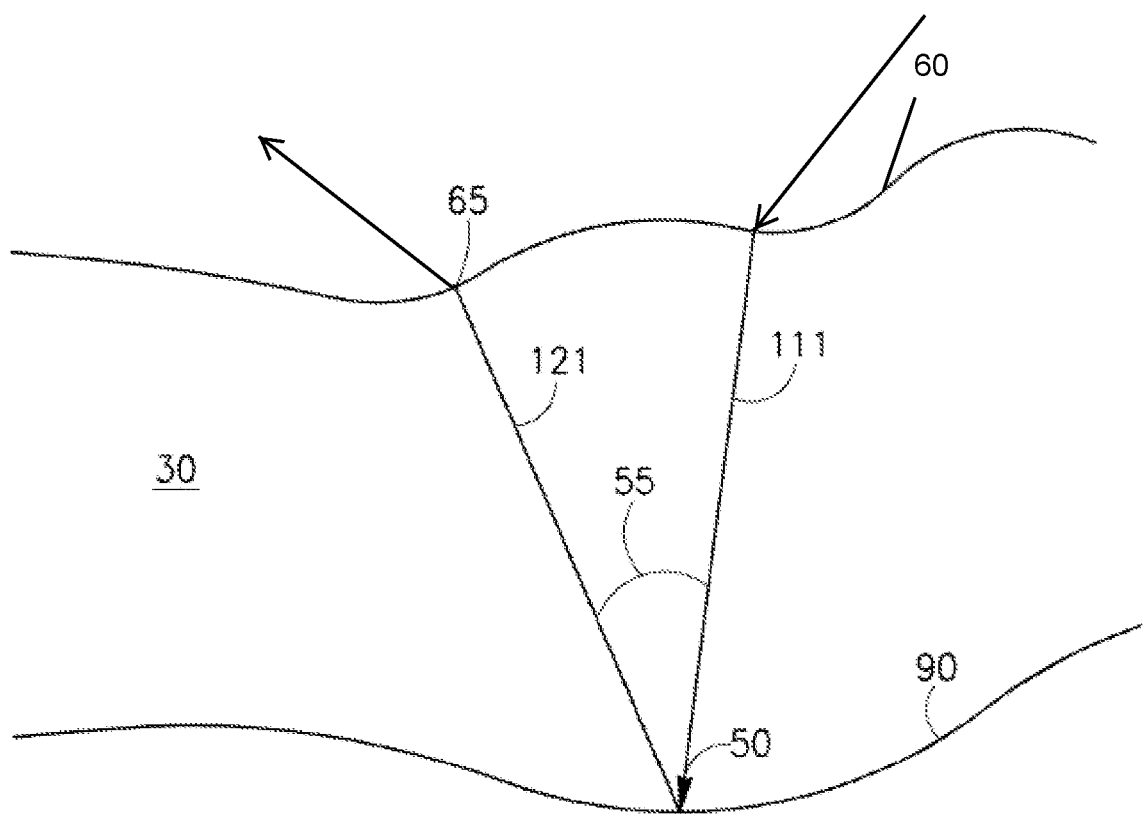
FIG. 6 schematically illustrates seismic tomography in which a series of incident and reflected waves are propagated through a subsurface region of the Earth to image the subsurface according to an embodiment of the invention.

Reference is made to FIG. 6, which is a schematic illustration of a geological tomography technique in which a series of incident rays 111 and reflected rays 121 are propagated through a subsurface region of the Earth 30 to image the subsurface, according to an embodiment of the invention.

One or more transmitter(s) (e.g., 190 of FIG. 5) located at incident location(s) 60 may emit a series of incident rays 111. Incident rays 111 may include for example a plurality of energy rays related to signal waves, e.g., sonic waves, seismic waves, compression waves, etc. Incident rays 111 may be incident on, and reflect off of, a subsurface structure or surface 90 at a reflection point 50. Multiple reflection points 50 may be identified or imaged or displayed in conjunction to display, for example, a horizon.

One or more receiver(s) (e.g., 140 of FIG. 5) located at reflected location(s) 65 may receive the reflection rays 121. Reflection rays 121 may be the reflected images of incident rays 111, for example, after reflecting off of image surface 90 at target point 50. The angle of reflection 55 may be the angle between corresponding incident rays 111 and reflected rays 121 at reflection point 50. An incident rays 111 and corresponding reflected rays 121 may propagate through a cross-section of a subsurface structure 30. Incident rays 111 may reflect off of a subsurface feature 90 at a reflection point 50, for example, a point on an underground horizon, the seafloor, an underground aquifer, etc.

One or more processor(s) (e.g., 120 of FIG. 5) may reconstitute incident and reflected rays 111 and 121 to generate an image the subsurface 30 using an imaging mechanism. For example, a common reflection angle migration (CRAM) imaging mechanism may image reflection points 50 by aggregating all reflected signals that may correspond to a reflection point, for example, reflected signals that may have the same reflection angle. In other examples, imaging mechanisms may aggregate reflected signals that may have the same reflection offset (distance between transmitter and receiver), travel time, or other suitable conditions.

The processor(s) may compose all of the reflection points 50 to generate an image or model of the present day underground subsurface of the Earth 30. One or more display(s) 180 of FIG. 5) may visualize the present-day subsurface image 30.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults and other features. The data may be generated by tomographic scanning, as discussed in reference to FIG. 6, e.g., received by for example a receiver receiving waves generated e.g., by an air gun or explosives, that may be manipulated and stored, e.g., in memory 150 of FIG. 5, and data such as images representing underground features may be presented to a user, e.g., as a visualization on display 180 of FIG.

When used herein, a subsurface image or model may refer to a computer-representation or visualization of actual geological features such as horizons and faults that exist in the real world. Some features when represented in a computing device may be approximations or estimates of a real world feature, or a virtual or idealized feature. A model, or a model representing subsurface features or the location of those features, is typically an estimate or a "model", which may approximate or estimate the physical subsurface structure being modeled with more or less accuracy.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method comprising:
   receiving seismic data measured by tomographic scanning using a transmitter emitting a series of incident waves that reflect at geological discontinuities throughout the subsurface geology of the Earth and collected by a set of geophones arranged in an irregularly spaced grid recording reflections of those waves in the subsurface geology of the Earth;
   transforming the collected seismic data by a Radon transform from a spatial domain to a transform domain in which the seismic data is represented by an initial combination of multidimensional Radon basis functions;

pre-computing a set of basis function correlation factors, which represent the temporal frequency dependent spectral leakage patterns between the multidimensional Radon transform basis functions, prior to computing an anti-leakage Radon transform of the seismic data;

in the transformed domain:
dividing the transformed seismic data into a plurality of temporal frequency slices;
geometrically scaling a spatial geometry of each temporal frequency slice independently by a temporal frequency of the temporal frequency slice, and
computing the anti-leakage Radon transform of the seismic data by:
iteratively progressing slice-by-slice, vertically through the geometrically scaled seismic data, to compute each jth Radon coefficient independently for each temporal frequency slice using the pre-computed basis function correlation factors, and
repeating said iteratively progressing for each subsequent j+1th coefficient until a relative error between the collected seismic data and an approximation of the collected seismic data based on the Radon coefficients is less than a predetermined convergence threshold,
wherein the Radon coefficients are computed solely in the transform domain based on the pre-computed basis function correlation factors, without reverse transforming to the spatial domain;
simulating seismic data collected in a regularly spaced grid by interpolating the anti-leakage Radon transform of the seismic data collected by the set of geophones arranged in the irregularly spaced grid; and
displaying an image of the simulated seismic data.

2. The method of claim 1, wherein the set of geophones are arranged in an irregularly spaced grid because of natural or man-made obstructions in land acquisition surveys; and said interpolating simulates seismic data which would have been collected if all geophones of the set of geophones were regularly spaced.

3. The method of claim 1, wherein the set of geophones are arranged in an irregularly spaced grid because one or more of the geophones drifts with current during marine acquisition surveys; and said interpolating simulates seismic data which would have been collected if all geophones of the set of geophones were stationary.

4. The method of claim 1, further comprising dividing the transformed seismic data horizontally and vertically into a plurality of mini-volumes, each mini-volume comprising a plurality of the temporal frequency slices.

5. The method of claim 4, further comprising:
computing the anti-leakage radon transform for one vertical column of the plurality of mini volumes at a time based on the pre-computed set of basis function correlation factors for only that column; and
when progressing to the next column, deleting the pre-computed current set of basis function correlation factors for the one column and overwriting the same or overlapping memory space with the pre-computed set of basis function correlation factors for the next column, such that the pre-computed set of basis function correlation factors is only stored at any particular time for the vertical column for which the current anti-leakage radon transform is currently being computed.

6. The method of claim 1, wherein the Radon basis functions represent parabolic data.

7. The method of claim 1, comprising, in each iteration, selecting a maximal energy Radon coefficient, updating the transformed seismic data by subtracting the Radon term corresponding to the selected maximal energy Radon coefficient, and resetting the next iteration with the updated transformed seismic data.

8. The method of claim 1, wherein the transform domain is a f-p domain.

9. The method of claim 1 comprising terminating said repeating when a relative error between the measured seismic data and its approximation by the computed anti-leakage Radon transform of the seismic data is within a predetermined threshold.

10. A system comprising:
a processor configured to:
receive seismic data measured by tomographic scanning using a transmitter emitting a series of incident waves that reflect at geological discontinuities throughout the subsurface geology of the Earth and collected by a set of geophones arranged in an irregularly spaced grid recording reflections of those waves in the subsurface geology of the Earth;
transform the collected seismic data by a Radon transform from a spatial domain to a transform domain in which the seismic data is represented by an initial combination of multidimensional Radon basis functions,
pre-compute a set of basis function correlation factors, which represent the temporal frequency dependent spectral leakage patterns between the multidimensional Radon transform basis functions, prior to computing an anti-leakage Radon transform of the seismic data by:
dividing the transformed seismic data into a plurality of temporal frequency slices, and
geometrically scaling a spatial geometry of each temporal frequency slice independently by a temporal frequency of the temporal frequency slice,
compute the anti-leakage Radon transform of the seismic data by:
iteratively progressing slice-by-slice, vertically through the geometrically scaled seismic data, to compute each jth Radon coefficient independently for each temporal frequency slice using the pre-computed basis function correlation factors, and
repeating said iteratively progressing for each subsequent j+1th coefficient until a relative error between the collected seismic data and an approximation of the collected seismic data based on the Radon coefficients is less than a predetermined convergence threshold,
wherein the Radon coefficients are computed solely in the transform domain based on the pre-computed basis function correlation factors, without reverse transforming to the spatial domain, and
simulate seismic data collected in a regularly spaced grid by interpolating the anti-leakage Radon transform of the seismic data collected by the set of geophones arranged in the irregularly spaced grid; and
a monitor, wherein the processor is configured to display an image of the simulated seismic data on the monitor.

11. The system of claim 10, wherein the set of geophones are arranged in an irregularly spaced grid because of natural or man-made obstructions in land acquisition surveys; and said interpolating simulates seismic data which would have been collected if all geophones of the set of geophones were regularly spaced.

12. The system of claim 10, wherein the set of geophones are arranged in an irregularly spaced grid because one or more of the geophones drifts with current during marine acquisition surveys; and said interpolating simulates seismic data which would have been collected if all geophones of the set of geophones were stationary.

13. The system of claim 10, wherein the processor is further configured to divide the transformed seismic data horizontally and vertically into a plurality of mini-volumes, each mini-volume comprising a plurality of the temporal frequency slices.

14. The system of claim 13, further comprising a memory configured to store pre-computed basis function correlation factors, wherein the processor is further configured to:
compute the anti-leakage radon transform for one vertical column of mini-volumes at a time based on the pre-computed set of basis function correlation factors for only that column; and
when progressing to the next column, delete the pre-computed current set of basis function correlation factors for the one column from the memory and overwriting the same or overlapping memory space with the pre-computed set of basis function correlation factors for the next column, such that the pre-computed set of basis function correlation factors is only stored at any particular time for the vertical column for which the current anti-leakage radon transform is currently being computed.

15. The system of claim 10, wherein the Radon basis functions represent parabolic data.

16. The system of claim 10, wherein the processor is configured to, in each iteration, select a maximal energy Radon coefficient, update the transformed seismic data by subtracting the Radon term corresponding to the selected maximal energy Radon coefficient, and reset the next iteration with the updated transformed seismic data.

17. The system of claim 10, wherein the transform domain is a f-p domain.

18. The system of claim 10, wherein the processor is configured to terminate said repeating when a relative error between the measured seismic data and its approximation by the computed anti-leakage Radon transform of the seismic data is within a predetermined threshold.

* * * * *